United States Patent [19]
Madany et al.

[11] Patent Number: 5,935,242
[45] Date of Patent: Aug. 10, 1999

[54] METHOD AND APPARATUS FOR INITIALIZING A DEVICE

[75] Inventors: Peter W. Madany, Fremont; Graham Hamilton, Palo Alto; Alan G. Bishop, Campbell, all of Calif.

[73] Assignee: Sun Microsystems, Inc., Mountain View, Calif.

[21] Appl. No.: 08/738,697

[22] Filed: Oct. 28, 1996

[51] Int. Cl.[6] .................................................. G06F 9/445
[52] U.S. Cl. ............................ 713/1; 713/2; 713/100; 714/13
[58] Field of Search ................................ 395/651, 652, 395/653, 182.02, 182.11, 671; 713/1, 2, 100; 709/101; 714/13

[56] References Cited

U.S. PATENT DOCUMENTS

| | | |
|---|---|---|
| 5,291,600 | 3/1994 | Lutz et al. . |
| 5,444,850 | 8/1995 | Chang . |
| 5,555,399 | 9/1996 | Waldron et al. . |
| 5,819,087 | 10/1998 | Le et al. .................................. 395/652 |

FOREIGN PATENT DOCUMENTS

| | | |
|---|---|---|
| 476195 | of 0000 | European Pat. Off. . |
| 682310 | of 0000 | European Pat. Off. . |

OTHER PUBLICATIONS

Mary Baker and Mark Sullivan, "The Recovery Box: Using Fast Recovery to Provide High Availability in the UNIX Environment", USENIX, pp. 31–44, Jun. 1992.

Welch et al., "Sprite Position Statement: Use Distributed State for Failure Recovery",Workstation Operating Systems: Proceedings of the Second Works, pp. 130–133 (1–4), Sep. 1989.

*Primary Examiner*—Majid A. Banankhah
*Attorney, Agent, or Firm*—Blakely Sokoloff Taylor & Zafman

[57] ABSTRACT

A system is provided for rebooting a computer having a volatile memory device capable of storing operating information. The system reboots the computer using the operating information stored in the memory device if the memory device contains a valid copy of the operating information. The computer reboots the computer by reloading the operating information into the memory device if the memory device does not contain a valid copy of the operating information. The system determines whether the memory device contains a valid copy of the operating information by calculating a checksum for the operating information stored in the memory device and compares the checksum to a previously calculated checksum.

25 Claims, 6 Drawing Sheets

METHOD AND APPARATUS FOR INITIALIZING A DEVICE

BACKGROUND OF THE INVENTION

1. Field of the Invention

The present invention relates to a system for controlling the rebooting of a device such as a computer.

2. Background

Computers and similar devices may require significant time to reboot or initialize themselves when powered-up or otherwise restarted. Computers that must receive large amounts of data over a communication link (such as a network) may experience greater delays when rebooting if the communication link is slow or congested due to other traffic on the link. For example, an inexpensive computer coupled to a network may receive its operating system and related files as well as application programs and other data from a server coupled to the network. This type of computer may be referred to as a "network-booted computer" and does not require a disk drive or other mass storage device for storing an operating system, application programs, and the like. Thus, each time the computer is rebooted, the operating system and related files are transmitted from the server to the computer across the network. The operating system and related files may be large in relation to the available transmission capacity of the network. The time required to transmit the operating system across the network is further increased if the network already has a high traffic volume or if multiple computers are rebooted at approximately the same time.

For example, a typical delay when rebooting a network-booted computer may be approximately 20–30 seconds when the network is not congested and other network-booted computers are not rebooted at the same time. However, as network traffic levels increase, the rebooting time also increases. For example, when the network is congested or several computers are rebooted at the same time, the time to reboot a particular computer may be several minutes. In certain situations, if network congestion is severe, a time-out mechanism may cause the computer booting procedure to fail. In this situation, the user must reboot the computer again and wait for the operating system and related files to be transferred across the network. Thus, the time required to reboot such computer systems is unpredictable.

During operation of a computer or similar device, certain errors or other faults may occur that require rebooting of the computer or device. This type of rebooting may be referred to as a "warm reboot" because the computer is already powered-up. In these situations, the operating system is already stored in the computer as a result of the initial booting of the computer. However, known systems perform a reboot similar to an initial boot by causing the entire operating system and related files to be transferred again to the computer. This repeated copying of the operating system and related files increases the time during which the computer is unavailable and increases the traffic on the network.

Other known systems use a non-volatile memory such as a Flash Read-Only Memory (Flash ROM) to store the operating system and related files in a network-booted computer. Since the Flash ROM is non-volatile, the operating system and related files are not reloaded when the system is rebooted. However, Flash ROM systems require special-purpose hardware (the Flash ROM) in addition to conventional Random Access Memory (RAM). Furthermore, these Flash ROM systems require additional software to update the contents of the Flash ROM and require additional control circuitry for controlling the operation of the Flash ROM. The additional software and control requirements for a computer system using Flash ROM increases the cost and complexity of the system.

It is therefore desirable to provide a system for quickly rebooting a computer without requiring the additional cost and complexity associated with systems using Flash ROMs.

SUMMARY OF THE INVENTION

Embodiments of the present invention provide a system for controlling the rebooting of a device such as a computer. When a warm reboot is triggered, the invention provides a mechanism for determining whether a valid copy of the operating system and related files are already stored in a memory device in the computer. The system avoids reloading the entire operating system if a valid copy of the operating system is already stored in the computer. The system does not require the additional cost and complexity associated with systems using Flash ROMs. This is particularly important in cost-sensitive devices such as network-booted computers and other network-booted devices.

An embodiment of the present invention provides a system that reboots the computer using the operating information stored in the memory device if the memory device contains a valid copy of the operating information. If the memory device does not contain a valid copy of the operating information, then the computer is rebooted by reloading the operating information into the memory device.

Another aspect of the invention determines whether the memory device contains a valid copy of the operating information by calculating a checksum for the operating information stored in the memory device and comparing the checksum to a previously calculated checksum.

Another feature of the invention reboots the computer by reloading the operating information across a network coupled to the computer if the memory device does not contain a valid copy of the operating information.

A further aspect of the invention copies a snapshot of initialized data back to an initialized data location in the memory device.

A particular embodiment of the invention provides an operating system based on the JAVA™ programming language environment and a computer capable of executing JAVA program codes.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, protocols, components, and circuits have not been described in detail so as not to obscure the invention.

Embodiments of the present invention are related to a system for controlling the rebooting of a device such as a computer. For example, when a warm reboot is triggered, the system determines whether a valid copy of the operating system (OS) is already stored in a memory device in the computer. If a valid copy of the OS is stored in the memory device, then the system uses the existing copy rather than unnecessarily copying the entire OS and related files from a remote location. In the example of a network-booted computer, the invention may significantly reduce the time required to reboot the computer. Furthermore, the invention may reduce the traffic on the network caused by copying the entire OS and related files across the network.

Although particular embodiments of the invention will be discussed with reference to a network-booted computer, those of ordinary skill in the art will appreciate that the present invention may be utilized with any type of device, including non-network-booted devices. The teachings of the invention may be applied to any device receiving operating information or other data from a source or a communication link that may become congested or otherwise limit the rate at which information is communicated to the device. The congestion on the communication link may be a result of other data flowing on the link or the capacity of the link relative to the amount of information to be transmitted (e.g., a slow communication link transmitting a large amount of data).

Figure 1:
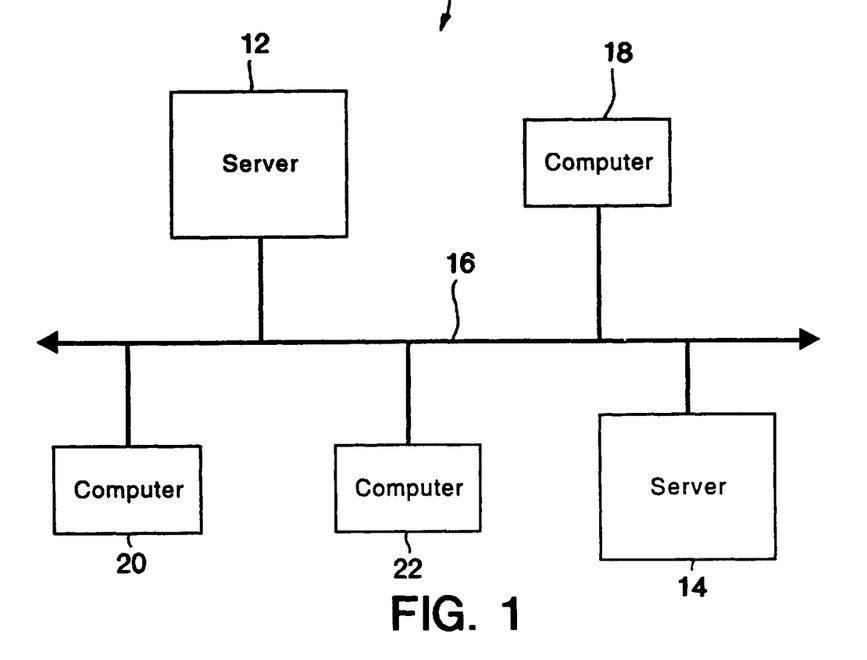
FIG. 1 illustrates an exemplary arrangement of multiple computers and multiple servers coupled together in a network environment.

FIG. 1 illustrates an exemplary arrangement of multiple computers and multiple servers coupled together in a network environment. A network 10 includes a pair of servers 12 and 14 coupled to communication medium 16. Servers 12 and 14 may be capable of storing and distributing operating information, such as an operating system, to network-booted devices coupled to the network. Computers 18, 20, and 22 are also coupled to communication medium 16 and are, in this example, network-booted computers. Network 10 may be any type of network using any type of communication protocol. Furthermore, communication medium 16 may be any type of wire, cable, or other medium capable of transmitting data. Alternatively, communication medium 16 can be a radio-frequency or infrared communication system for transmitting signals and data between various computers, servers, and other devices. Although communication medium 16 is shown as being coupled to multiple devices, in alternate embodiments communication medium 16 is a single point-to-point communication link between, for example, a computer and a server.

Servers 12 and 14 shown in FIG. 1 are capable of receiving and distributing data across communication link 16. Similarly, computers 18–22 may be any type of computer system including a network-booted computer. A network-booted computer is generally a relatively simple device that receives its operating system and related files from a server coupled to the network. The operating system and related files may be collectively referred to as "operating information."

Figure 2:
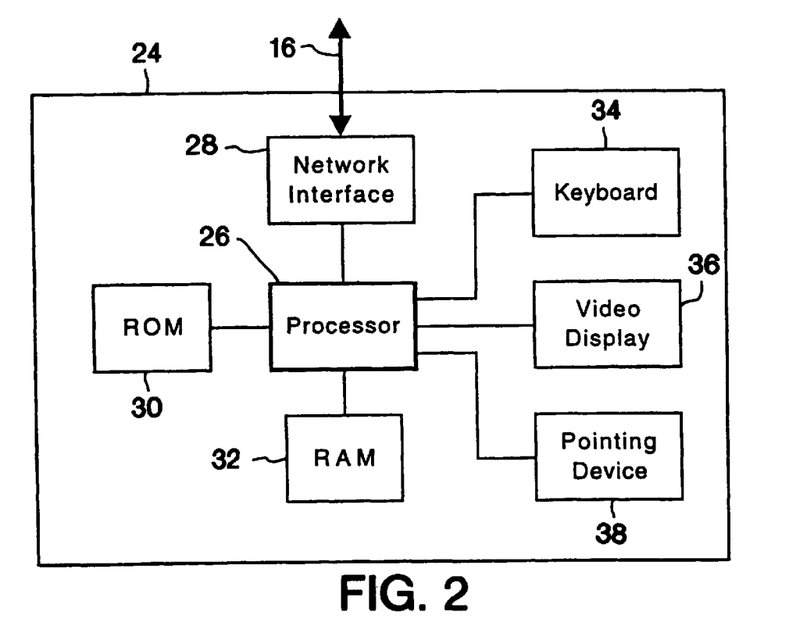
FIG. 2 illustrates an embodiment of a network-booted computer capable of utilizing the teachings of the invention.

FIG. 2 illustrates an embodiment of a network-booted computer 24 capable of utilizing the teachings of the present invention. Network-booted computer 24 includes a processor 26 capable of executing instructions to control the operation of computer 24. A network interface 28 is coupled between processor 26 and network communication medium 16, and provides a mechanism for coupling computer 24 to a network. A Read-Only Memory (ROM) 30 and a Random Access Memory (RAM) 32 are coupled to processor 26 and are capable of storing information used by processor 26. ROM 30 stores information necessary to boot (or initialize) computer 24 at power-up. This boot information may include a basic set of instructions for establishing communication with a network through network interface 28. The boot information may also include instructions for initializing the components in computer 24 and requesting the loading of an OS and related files from a server coupled to the network. As discussed in greater detail below, RAM 32 stores the OS and related files as well as other data and variables used by processor 26.

Computer 24 shown in FIG. 2 also includes a keyboard 34, a video display 36 and a pointing device 38. These devices are shown in FIG. 2 as being coupled directly to processor 26. Alternatively, keyboard 34, video display 36, and pointing device 38 may be coupled to an interface or other mechanism that is coupled to processor 26. Note that computer 24 does not include a disk drive or other long term storage device, a printer, or separate Input/Output (I/O) ports. To minimize cost and complexity, these components are not typically included in a network-booted computer. Instead, the computer downloads its operating system and related files across the network from a server. Similarly, the computer downloads application programs and other data across the network from a server. Although the embodiment of computer 24 shown in FIG. 2 does not include a disk drive, printer, or I/O ports, those skilled in the art will appreciate that alternate embodiments of a computer may include any or all of these components.

In a particular embodiment of the invention, network-booted computer 24 uses an operating system based on the JAVA™ programming language environment developed by Sun Microsystems™ Inc. of Mountain View, Calif. Sun, Sun Microsystems, the Sun logo, and JAVA are trademarks or registered trademarks of Sun Microsystems Inc. in the United States and other countries. JAVA is an object-oriented and architecture-neutral programming language environment. Thus, while other computer languages must be compiled for a particular processor, JAVA programs are interpreted such that a single JAVA program may be used with a variety of processors. Alternatively, JAVA programs may be compiled using a just-in-time (JIT) compiler. The JIT compiler converts the JAVA code to the processor's native code shortly before the compiled code is needed by the processor. JAVA programs and JAVA-based operating systems may be executed on any computer platform that supports a JAVA virtual machine (the JAVA virtual machine executes JAVA byte-codes).

Figure 3:
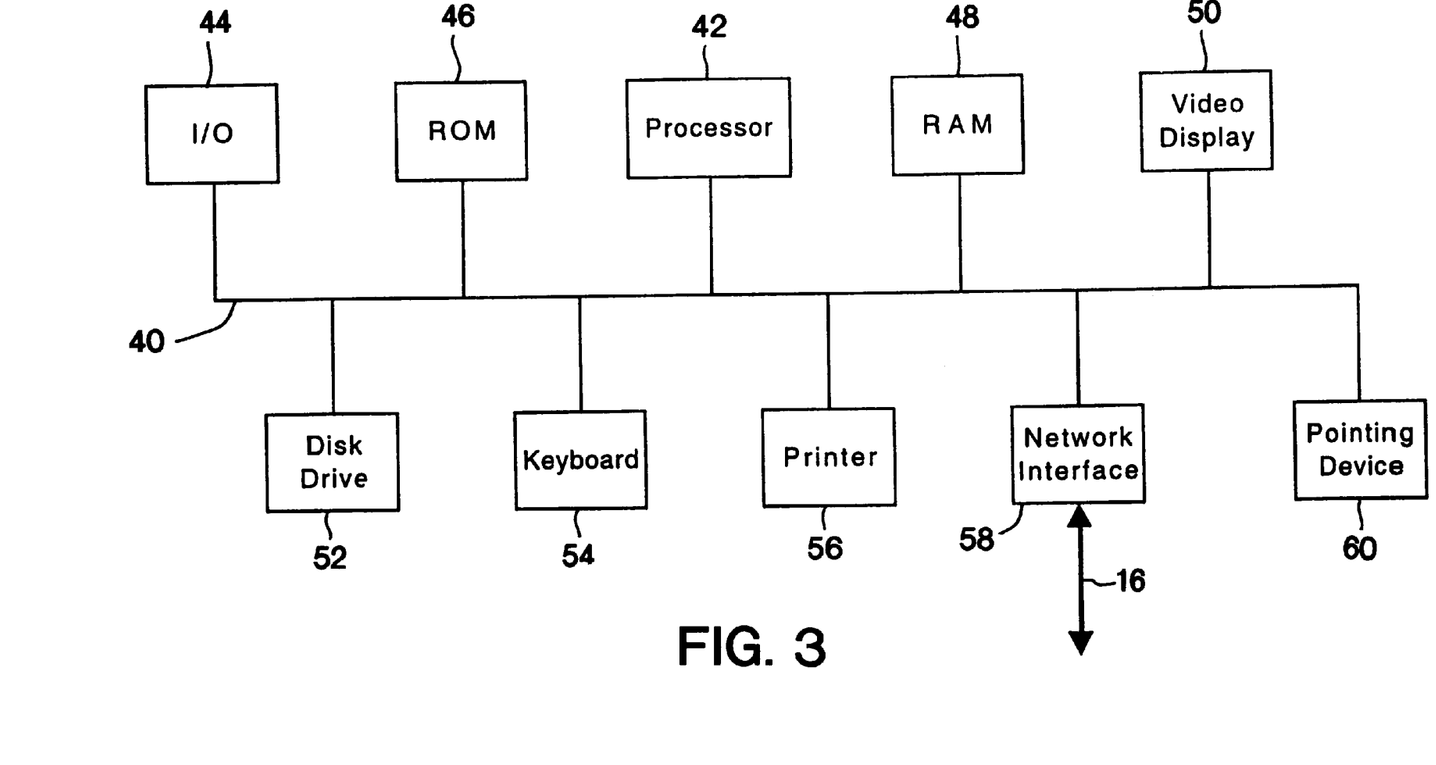
FIG. 3 illustrates a particular embodiment of a server capable of communicating with various computers and servers coupled to a network.

FIG. 3 illustrates a particular embodiment of a server capable of communicating with various computers and servers coupled to a network. The server of FIG. 3 may communicate with other computers by transmitting and receiving information across the network. Additionally, the server may store information for distribution to computers and other servers coupled to the network. This stored information may include operating systems and related files, application programs, and other files used by the server or other computers coupled to the network.

The components shown in FIG. 3 are provided by way of example, and certain components may be deleted for a particular implementation of the invention. FIG. 3 illustrates a system bus 40 to which the server components are coupled. A processor 42 performs the processing tasks required by the server. An Input/Output (I/O) device 44 is coupled to bus 40 and provides a mechanism for communicating with other devices coupled to the server. A ROM 46 and a RAM 48 are coupled to bus 40 and provide a storage mechanism for various data stored and used by the server. Although ROM 46 and RAM 48 are shown coupled to bus 40, in alternative embodiments of the invention, ROM 46 and RAM 48 may be coupled directly to processor 42.

A video display 50 is coupled to bus 40 and displays various information and data to the network administrator or user of the server. A disk drive 52 is coupled to bus 40 and provides for the long-term mass storage of information. A keyboard 54 and pointing device 60 are coupled to bus 40 and provide mechanisms for entering information and commands to the server. A printer 56 is coupled to bus 40 and capable of creating a hard copy of information generated or stored by the server. A network interface 58 is coupled between bus 40 and network communication medium 16. Network interface 58 provides a mechanism for transferring information between the server and other devices and computers coupled to network communication medium 16.

Figure 4:
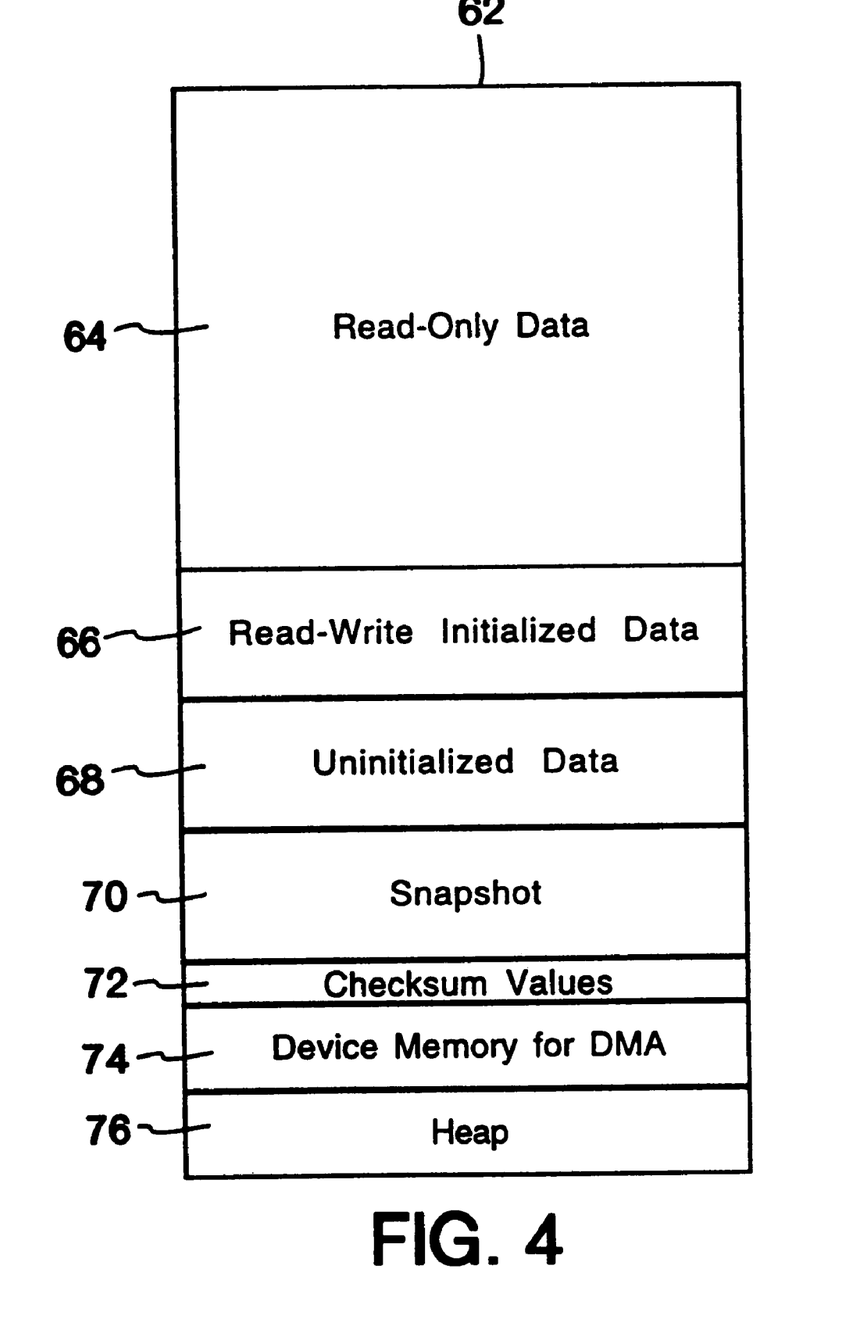
FIG. 4 illustrates an embodiment of a configuration used to store data in a memory device.

FIG. 4 illustrates an embodiment of a configuration used by a computer to store data in a memory device 62 located within the computer. The configuration of the data shown in FIG. 4 represents one possible configuration of memory device 62. The types of data shown in FIG. 4 are for illustration purposes only, and represent one possible set of data types. Additionally, the size of the various memory regions in memory device 62 are not drawn to scale. Those skilled in the art will appreciate that various configurations may be used to store various types of data in memory device 62. In a particular embodiment of the invention, memory device 62 is a RAM.

As shown in FIG. 4, memory device 62 includes various memory regions (64–76) for storing various types of data. The memory regions 64–76 do not have fixed boundaries or fixed sizes. Instead, memory regions 64–76 are established during booting of the computer to store the necessary operating system information and other data. Memory region 64 of memory device 62 contains Read-Only Data. This Read-Only Data may include the operating system instructions (e.g., machine code) and other data that is not changed during the operation of the computer. To prevent accidental modification of these system instructions, the data is marked as read-only. Marking the data as read-only may be accomplished by a Memory Management Unit (MMU) or similar mechanism for managing a memory device. A MMU may be located in a processor or a separate component of the computer.

Memory device 62 also includes memory region 66 that contains Read-Write Initialized Data. This Read-Write Initialized Data may include variables and other data that is initialized during the compilation of the operating system or during the initial booting of the computer. The Read-Write Initialized Data may include, for example, the addresses of peripheral devices or the default values associated with peripheral devices. The Read-Write Initialized Data may be updated during operation of the computer.

Memory device 62 also includes memory region 68 that contains Uninitialized Data. The Uninitialized Data may include the initial operating system stack segment, and variables or other data that do not have values assigned during the initial booting of the computer. During the initial booting and subsequent rebooting of the computer, memory region 68 is set aside by the memory manager in the ROM for future use by variables and other data. During operation of the computer system, variables and other data may be added to or removed from memory region 68.

Memory device 62 also includes memory region 70 that contains Snapshot data. The Snapshot data includes a copy of the Read-Write Initialized Data (stored in memory region 66). As discussed in greater detail below, the Snapshot data is created after the initial booting of the computer system and may be copied back to memory region 66 during subsequent rebooting of the computer system. Although FIG. 4 illustrates the Snapshot data stored in memory device 62, the Snapshot data may, alternatively, be stored in a separate memory device.

Memory region 72 contains Checksum Values used during subsequent rebooting to determine whether the data contained in a particular memory region is valid. A separate checksum value may be calculated for each memory region 64 and 66, or a single checksum value may be calculated for both memory regions.

In an embodiment of the invention, checksum values are calculated for memory region 64 (Read-Only Data) and memory region 66 (Read-Write Initialized Data). Alternatively, checksum values may be calculated for memory regions 64 and 70 (Snapshot data). The checksum values are calculated upon completion of the initial booting of the computer. During subsequent rebooting of the computer, the checksum values stored in memory region 72 are used to determine whether memory regions 64 and 66 contain data that matches the data stored in those regions during initial booting of the computer. Those skilled in the art will appreciate that various procedures may be used to calculate the checksum values. Furthermore, various numbers of checksum bits may be used based on the level of confidence desired by the user or system administrator.

Memory device 62 also includes memory region 74 that contains device memory for direct memory access (DMA) and memory region 76 that contains the heap. Although the device memory for DMA is illustrated as one memory region, alternate embodiments may include several different memory regions.

Figure 5:
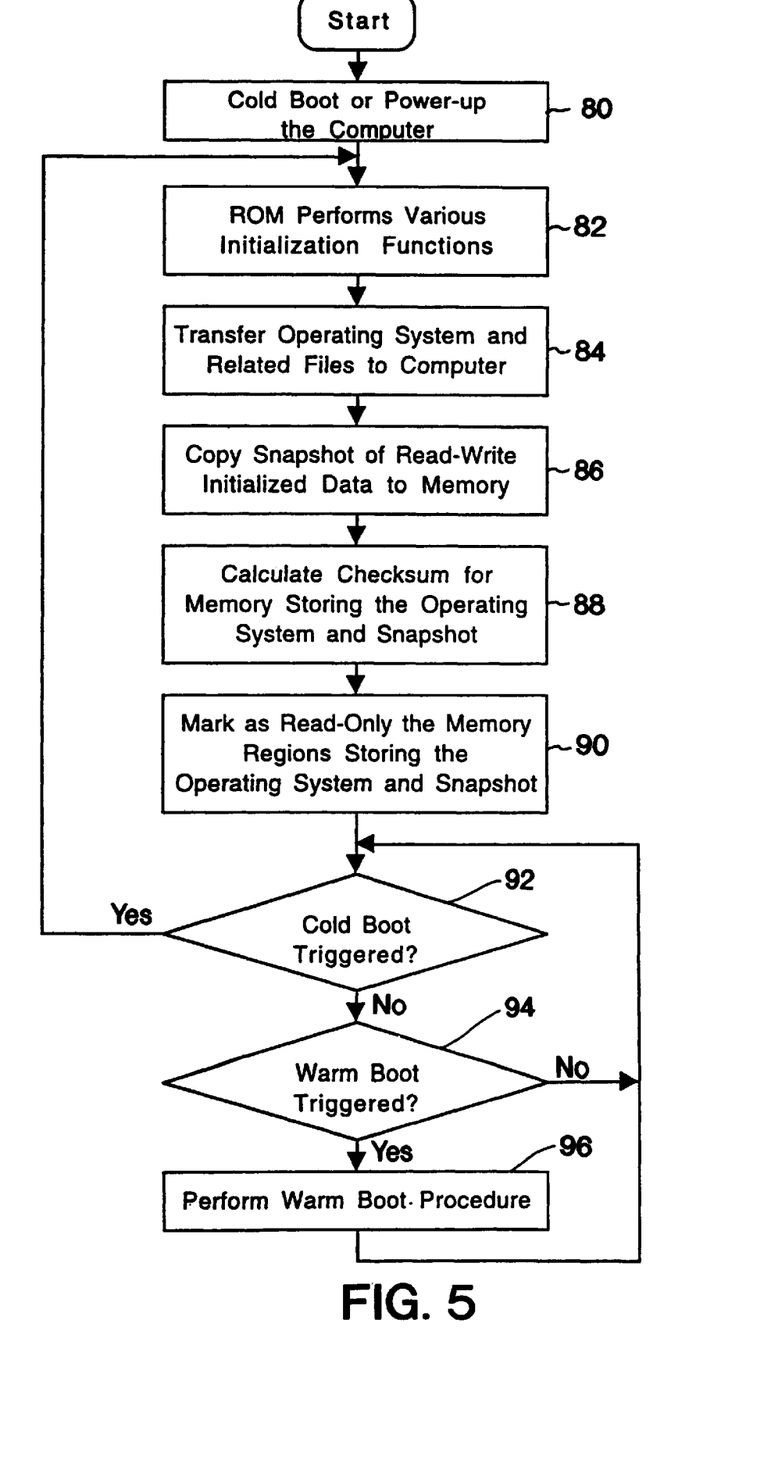
FIG. 5 is a flow diagram illustrating an embodiment of a procedure for booting a computer.

FIG. 5 is a flow diagram illustrating an embodiment of a procedure for booting a computer at power-up (also referred to as "cold booting") and testing for subsequent boot triggers. At step 80, the computer is powered-up or cold booted. At step 82, a ROM in the computer (often referred to as the "boot ROM") performs various initialization functions. These initialization functions include device discovery, device initialization, and initialization of the memory manager or MMU. The initialization functions may also include determining the boot server for the booting device.

At step 84, the operating system and related files are transferred, for example, from a server to the computer across a network. The transfer of the OS and related files may be initiated when the boot ROM requests a copy of the OS from the boot server. Since the OS and related files are typically large (e.g., 4 Megabytes or larger), the time required for this initial transfer of the OS and related files will vary with the level of network traffic and available network resources. The OS and related files may include the kernel, class files or object files, networking code, windowing and graphics code, device drivers, fonts, graphic images, icons, help files, and similar files used during the operation of the computer. As the OS and related files are transferred to the computer, the memory manager establishes the various memory regions 64–76 (FIG. 4) as needed. In a particular embodiment of the invention, the entire OS and all related files are transferred at the same time. In alternate embodiments of the invention, the primary OS files are transferred when booting and the remaining files are transferred periodically or as needed.

After the OS and related files are transferred to the computer, step 86 of FIG. 5 creates a copy of the Read-Write Initialized Data, stored in memory region 66, and stores the copy (or Snapshot) in memory region 70. This Snapshot is used during subsequent rebooting of the computer, as discussed below with reference to FIG. 6.

Step 88 calculates a checksum value for the memory regions storing the Read-Only Data (region 64) and the Snapshot Data (region 70). Alternatively, step 88 may calculate a checksum value for memory regions 64 and 66, because memory regions 66 and 70 contain the same data at this stage of the initialization procedure. As discussed above, the Read-Only Data contains the OS code and other data that does not change during the operation of the computer. A single checksum value may be calculated for both memory regions 64 and 70, or separate checksum values may be calculated for each region. At step 90, the memory regions storing the OS and the Snapshot (regions 64 and 70) are marked as read-only by the memory manager. Marking regions 64 and 70 as read-only prevents accidental modification of the data stored in the regions. Thus, steps 88 and 90 both provide protection for the data in memory regions 64 and 70. If a particular computer does not have a memory manager for marking memory regions as read-only, the checksum values calculated in step 88 will provide a mechanism for determining whether the data in region 64 or 70 has changed since initial booting of the computer.

Step 92 of FIG. 5 determines whether a cold boot was triggered. A cold boot may be triggered by the user of the computer or by the OS upon detection of a significant error or fault. If a cold boot trigger is identified at step 92, the procedure branches to step 82 and repeats the cold boot procedure. If a cold boot is not identified at step 92, the procedure continues to step 94 to determine whether a warm boot was triggered. A warm boot may be triggered by the user of the computer or by the OS upon detection of an error condition. The user may trigger a warm boot by activating a predefined sequence of keys. The OS may trigger a warm boot if the OS detects an attempt to write to ROM or an attempt to access unmapped memory.

If a warm boot is not triggered at step 94, the procedure returns to step 92 to test for a cold boot trigger. If a warm boot is triggered at step 94, the procedure continues to step 96 where the warm boot procedure is performed. This warm boot procedure is discussed below in FIG. 6.

In an embodiment of the invention, a warm boot is triggered each time a user logs out of the computer. The warm boot after logging out resets the computer system by clearing the stack and other variables to provide a "clean" system for the next user (i.e., no remaining state information from the previous user). By using the procedures discussed below in FIG. 6, the warm booting procedure is performed quickly such that the next user is not required to wait during a lengthy cold boot procedure.

Figure 6:
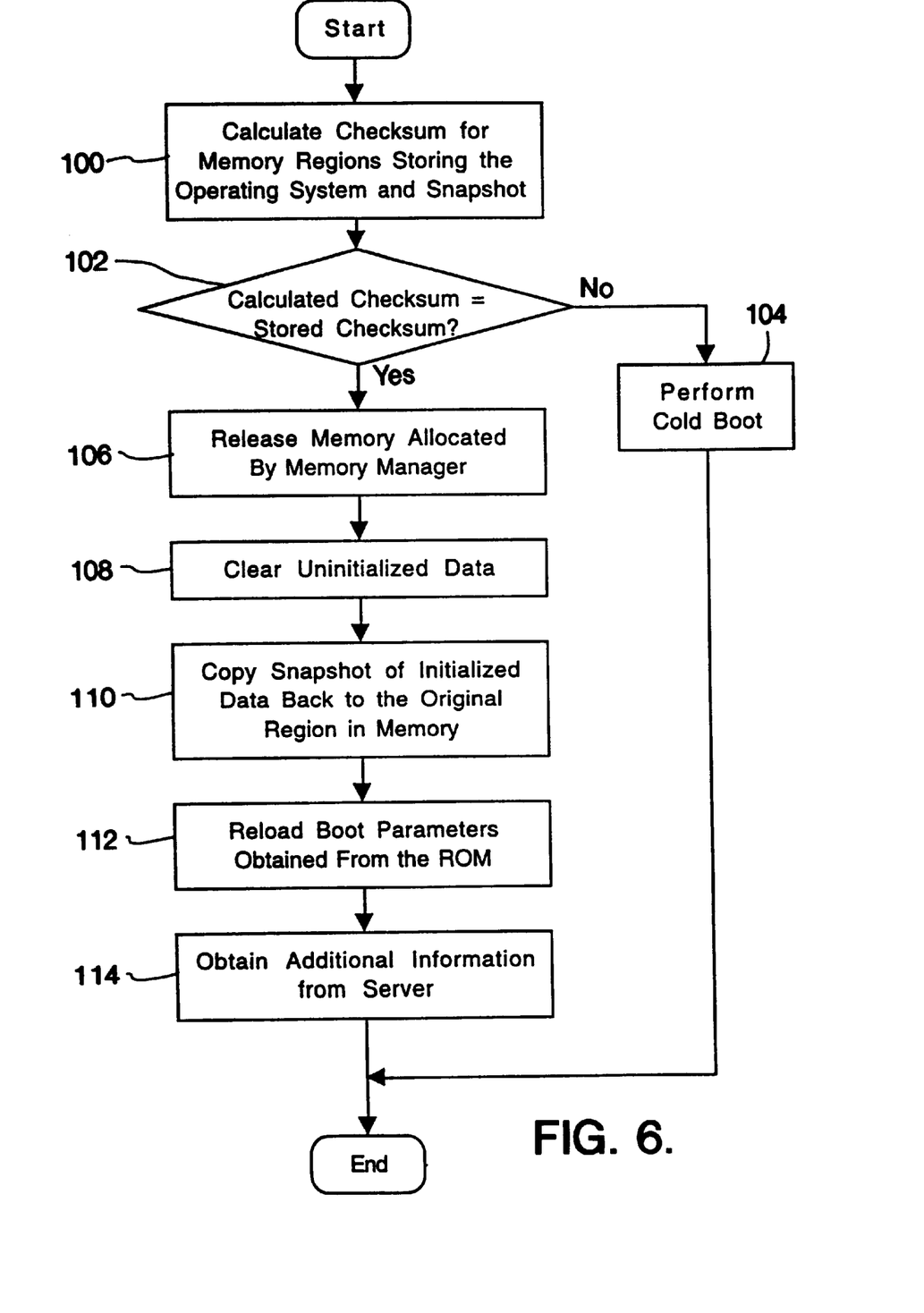
FIG. 6 is a flow diagram illustrating an embodiment of a procedure for warm booting a computer.

FIG. 6 is a flow diagram illustrating an embodiment of a procedure for warm booting a computer. Warm booting refers to the rebooting of a computer without powering-down the system. At step 100, the procedure calculates a checksum value for the memory regions storing the OS and the Snapshot (regions 64 and 70). As discussed above, a single checksum value may be calculated for both memory regions, or separate checksum values may be calculated for each region. Step 102 compares the checksum value (or values) calculated at step 100 with the checksum value (or values) of the current data stored in memory regions 64 and 70. If the checksum values are do not match at step 102, then the procedure branches to step 104 to perform a cold boot of the computer. The mismatched checksum values indicate that one or both of memory regions 64 and 70 contain invalid or corrupted data. Therefore, the data in these regions cannot be relied upon when rebooting the computer and a cold boot is performed. As discussed above, the cold boot procedure causes the entire OS to be transferred to the computer, for example, from a network server.

If the checksum values match at step 102, then the procedure continues to step 106 where memory allocated by the memory manager is released. If checksum values are not supported by the computer, then the procedure relies on the marking (read-only) performed by the memory manager at step 90 in FIG. 5. In systems that do not support checksum values, the warm boot procedure begins at step 106.

As mentioned above, step 106 of FIG. 6 releases memory allocated by the memory manager. For example, the memory allocated by the memory manager may include heap 76 and device memory for DMA 74. By releasing these memory resources, the memory manager is able to reassign the memory to other variables and data during the warm boot procedure. The memory is released by sending a signal to the memory manager indicating the release of the memory resources.

At step 108 of FIG. 6, uninitialized data in memory region 68 is cleared from memory device 62. All uninitialized data is cleared except the data currently being used by the computer to perform the warm reboot procedure (e.g., the current stack being used by the computer). This step clears the data for use by the computer after rebooting. Step 110 copies the Snapshot Data (memory region 70) back to memory region 66, thereby replacing the existing Read-Write Initialized Data with the previously stored Snapshot Data. As discussed above, the Snapshot Data represents the state of memory region 66 immediately after initial booting of the computer. Thus, any invalid or corrupted data in memory region 66 is replaced by the Snapshot Data.

Step 112 of FIG. 6 reloads the boot parameters obtained from the ROM in the computer (if the ROM supports boot parameters). These boot parameters are used to select optional behavior such as turning on debugging procedures or identifying the first program to run after booting. The boot parameters may include the debugging level or the name of the first program to be run after booting.

Step 114 communicates with the server across the network to obtain any additional information necessary to complete the warm reboot procedure. This additional information may include an option flag (indicating that an optional behavior has been selected), network addresses, or the names of network servers. This additional information is small relative to the size of the entire operating system and related files. Typically, the time required to transfer the additional information is a fraction of a second and does not create any significant increase in network traffic flow. Step 114 is optional and may not be required for certain systems.

When the warm boot procedure of FIG. 6 ends, the overall operation shown in FIG. 5 branches from step 96 to step 92 to test for a cold boot trigger. When the warm boot procedure is completed, the computer system resumes normal operation under control of the operating system. It is not necessary to create a Snapshot of the Read-Write Initialized Data because the previously created Snapshot in memory region 70 is not affected by the warm boot procedure. Similarly, it is not necessary to calculate checksum values or mark certain memory regions as read-only because these operations were performed during initial booting and are unaffected by the warm boot procedure.

As described above with respect to FIG. 6, instead of transferring the entire operating system and related files, only a small amount of data is transmitted over the network to the computer. This procedure minimizes network congestion and minimizes the time required for the system to reboot. Since the operating system and related files are already stored in the computer's memory device, the warm boot procedure uses this existing data unless it is determined to be invalid or corrupted. If a user desires to have the operating system and associated files reloaded over the network from a server, a cold boot procedure can be initiated by cycling the power to the computer.

Figure 7:
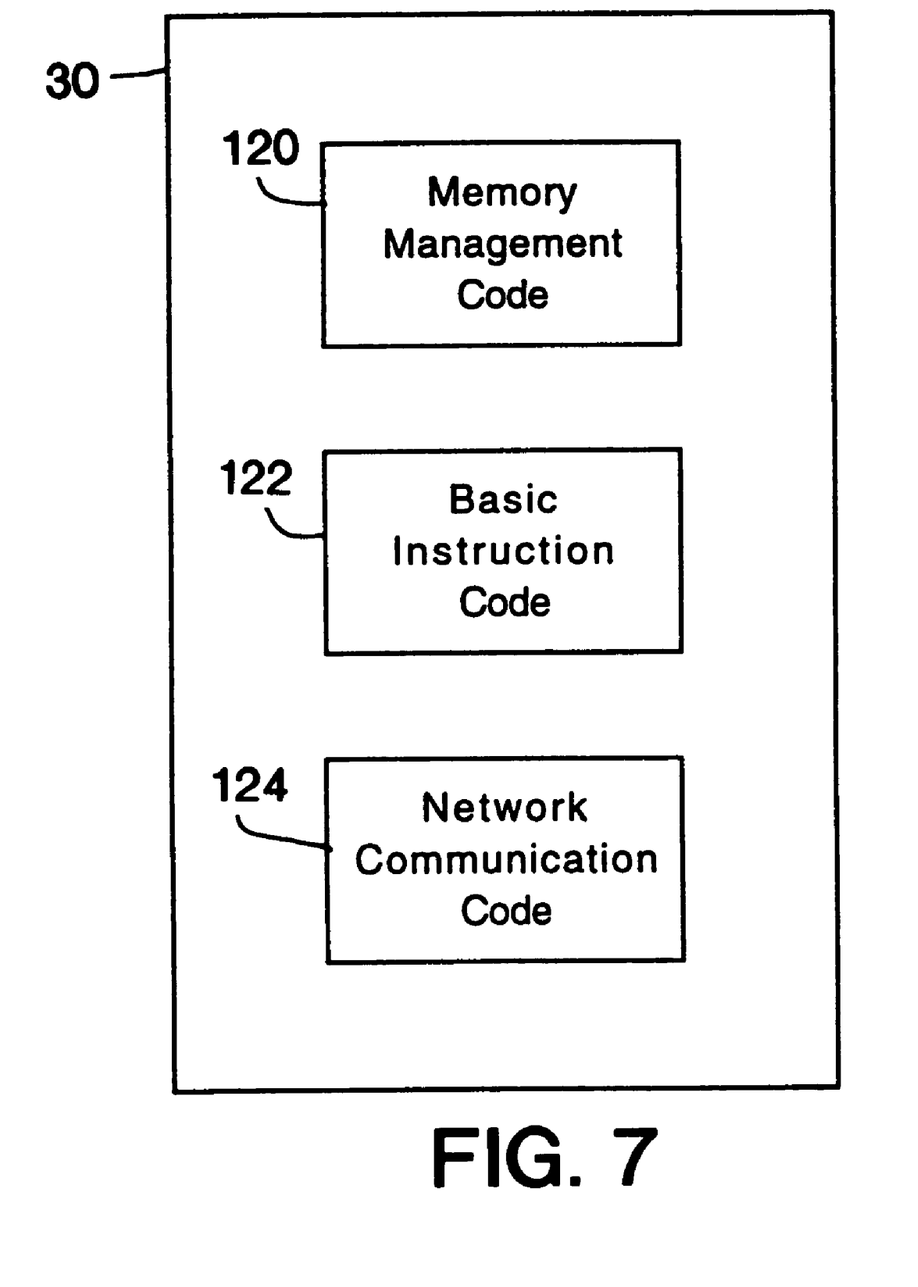
FIG. 7 illustrates an embodiment of a Read-Only Memory (ROM) contained in a computer.

FIG. 7 illustrates an embodiment of ROM 30 contained in computer 24 (shown in FIG. 2). ROM 30 may include memory management code 120 for allocating and controlling memory resources. These memory resources may include RAM 32 contained in the computer. ROM 30 may also include basic instruction code 122 and network communication code 124. Basic instruction code 122 is used by processor 26 during the early stages of booting, before the operating system is loaded into the computer. Network communication code 124 is used by processor 26 to communicate with network 16 through network interface 28. Those skilled in the art will appreciate that other information, data, and routines may be stored in ROM 30 for use by the computer.

The above descriptions and examples illustrate the application of the invention to a computer coupled to a network and receiving an operating system and related files across the network from a server. However, the teachings of the present invention may be applied to any situation where it is desirable to minimize initialization or rebooting time. For example, the invention may be used in a computer system to avoid reloading an entire operating system or other data from a disk drive, CD-ROM drive, or other storage device. Similarly, the invention may be applied to any peripheral device that may require a significant time period to initialize, such as a video monitor. By using information already stored in the computer's memory, the computer is not required to reload the existing information, unless that information is invalid. Additionally, the invention may be used in a situation where a slow or congested communication link exists between the computer and the source of the information. Even a small amount of information may take a significant period of time to be transmitted across a communication link having a small available bandwidth. In this situation, the present invention may be utilized to minimize the time required to reboot the computer.

The above procedures and systems may be implemented in a computer software product stored on a medium readable by a processor. Such a medium may include any type of magnetic, optical, or electrical storage medium including a diskette, CD-ROM, memory device, or similar medium. The computer-readable medium may include various sequences of instructions and other information for implementing the procedures and systems described above.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the invention as defined by the appended claims in view of their full scope of equivalents.

What is claimed is:

1. A method for rebooting a computer having a volatile memory device to store operating information, said method comprising: rebooting said computer using said operating information stored in said volatile memory device and releasing memory regions allocated by a boot ROM memory manager in said computer to allow reassignment of the released memory regions if said volatile memory device contains a valid copy of said operating information; and reloading said operating information into said volatile memory device if said memory device does not contain a valid copy of said operating information.

2. The method of claim 1 further including the step of determining whether said memory device contains a valid copy of said operating information.

3. The method of claim 2 wherein the step of determining whether said memory device contains a valid copy of said operating information includes calculating a checksum for said operating information stored in said memory device and comparing said checksum to a previously calculated checksum.

4. The method of claim 1 wherein said operating information includes an operating system for controlling the operation of the computer and data utilized by said operating system.

5. The method of claim 1 wherein said steps are performed in response to an event triggering the rebooting of said computer.

6. The method of claim 1 wherein the step of rebooting said computer by reloading said operating information further includes reloading said operating information across a network coupled to said computer.

7. The method of claim 1 further including the step of copying a snapshot of initialized data back to an initialized data location in said volatile memory device if said memory device contains a valid copy of said operating information.

8. The method of claim 1 further including the step of clearing uninitialized data from said volatile memory device.

9. The method of claim 1 wherein said volatile memory device is a Random Access Memory (RAM) device.

10. The method of claim 1 further including the step of marking said operating information stored in said memory device as read-only.

11. The method of claim 1 wherein said operating information is an operating system based on the JAVA programming language environment and said computer is capable of executing JAVA program codes.

12. An apparatus for rebooting a computer having a volatile memory device capable of storing operating information, comprising:

a mechanism configured to reboot said computer using said operating information stored in said volatile memory device and a boot ROM memory manager in said computer configured to assign memory regions, the assigned memory regions released during reboot to allow reassignment of the released memory regions when said memory device contains a valid copy of said operating information; and a mechanism configured to reboot said computer by reloading said operating information into said volatile memory device if said memory device does not contain a valid copy of said operating information.

13. The apparatus of claim 12 further including a mechanism configured to determine whether said memory device contains a valid copy of said operating information.

14. The apparatus of claim 13 wherein the mechanism configured to determine whether said memory device contains a valid copy of said operating information includes a mechanism configured to calculate a checksum for said operating information stored in said memory device and compare said checksum to a previously calculated checksum.

15. The apparatus of claim 12 wherein said computer is coupled to a network to reload said operating information across said network to said computer if said memory device does not contain a valid copy of said operating information.

16. The apparatus of claim 12 further including a mechanism configured to copy a snapshot of initialized data back to an initialized data location in said memory device if said memory device contains a valid copy of said operating information.

17. The apparatus of claim 12 wherein said memory device is a Random Access Memory (RAM) device.

18. The apparatus of claim 12 wherein said computer uses an operating system based on the JAVA programming language environment and said computer is capable of executing JAVA program codes.

19. A computer software product including a medium readable by a processor, the medium having stored thereon:

a first sequence of instructions which causes a reboot of said computer using operating information stored in a volatile memory device in said computer and causes a boot ROM memory manager to release memory location assigned by the boot ROM memory manager during the reboot process when said volatile memory device contains a valid copy of said operating information; and a second sequence of instructions which causes a reboot of said computer by reloading said operating information into said volatile memory device if said volatile memory device does not contain a valid copy of said operating information.

20. The computer software product of claim 19 further including a third sequence of instructions which, when executed by a processor, causes said processor to determine whether said memory device contains a valid copy of said operating information.

21. The computer software product of claim 20 wherein the third sequence of instructions further causes the processor to calculate a checksum for said operating information stored in said memory device and compare said checksum to a previously calculated checksum.

22. The computer software product of claim 19 wherein said operating information is an operating system based on the JAVA programming language environment and said computer is capable of executing JAVA program codes.

23. A reboot procedure comprising:

receiving a log out signal from a user;

warm booting a computer system in response to the log out signal when a processor determines that a checksum value for a memory region which stores an operating system matches a checksum value of current data stored in a volatile memory device; and cold booting the computer system in response to the log out signal when the processor determines that the checksum value for the memory region which stores an operating system does not match the checksum value of current data stored in the volatile memory device.

24. The method of claim 23 further comprising:

clearing uninitialized data in a memory region except data used by a computer to perform a warm reboot.

25. The method of claim 23 wherein the warm booting further comprises:

using operating system information stored in volatile memory to perform the warm boot.

* * * * *